(12) United States Patent
Nordmann et al.

(10) Patent No.: US 7,160,336 B2
(45) Date of Patent: Jan. 9, 2007

(54) LIQUID FORMULATIONS OF DIRECT DYES

(75) Inventors: Gero Nordmann, Heidelberg (DE); Helmut Reichelt, Neustadt (DE); Ingo Klopp, Weisenheim (DE); Gunter-Rudolf Schroeder, Mannheim (DE)

(73) Assignee: BASF Aktiengesellschaft, Ludwigsshafen (DE)

( * ) Notice: Subject to any disclaimer, the term of this patent is extended or adjusted under 35 U.S.C. 154(b) by 0 days.

(21) Appl. No.: 11/200,109

(22) Filed: Aug. 10, 2005

(65) Prior Publication Data
US 2006/0042028 A1    Mar. 2, 2006

(30) Foreign Application Priority Data
Sep. 2, 2004   (EP)  ................. 04020878

(51) Int. Cl.
*C09B 67/44*  (2006.01)
*C09B 67/36*  (2006.01)
*C09B 67/00*  (2006.01)

(52) U.S. Cl. .................... 8/638; 8/641; 8/664
(58) Field of Classification Search .............. 8/557, 8/638, 664, 641
See application file for complete search history.

(56) References Cited

U.S. PATENT DOCUMENTS

| | | | |
|---|---|---|---|
| 4,421,602 A | 12/1983 | Brunnmueller et al. | |
| 4,617,381 A | 10/1986 | Hinson et al. | |
| 5,554,261 A | 9/1996 | Nilz et al. | |
| 2004/0238791 A1 | 12/2004 | Champ et al. | |
| 2005/0132510 A1 | 6/2005 | Decker et al. | |

FOREIGN PATENT DOCUMENTS

| | | |
|---|---|---|
| DE | 3046450 * | 8/1981 |
| DE | 31 28 478 A1 | 2/1983 |
| DE | 42 33 040 A1 | 4/1994 |
| DE | 197 16 821 A1 | 10/1998 |
| EP | 0663 031 | 7/1995 |
| EP | 1 258 562 A2 | 11/2002 |
| EP | 1 548 069 A1 | 6/2005 |
| JP | 64-24873 | 1/1989 |
| JP | 64-81871 | 3/1989 |
| WO | WO 94/08092 | 4/1994 |
| WO | WO 00/73390 A1 | 12/2000 |
| WO | WO 03/020808 A1 | 3/2003 |

OTHER PUBLICATIONS

Derwent abstract of DE 3046450, Aug. 1981.*

* cited by examiner

*Primary Examiner*—Lorna M. Douyon
*Assistant Examiner*—Amina Khan
(74) *Attorney, Agent, or Firm*—Oblon, Spivak, McClelland, Maier & Neustadt, P.C.

(57) ABSTRACT

The present invention relates to an aqueous liquid formulation comprising

| | |
|---|---|
| 5–25% by weight | of a dye composition comprising |
| 20–100% by weight | of Direct Yellow 11 or of a dye obtainable by reduction or thermal treatment of Direct Yellow 11 |
| 0–30% by weight | of a blue direct dye, |
| 0–30% by weight | of a red direct dye, and |
| 0–60% by weight | of a brown direct dye all based on the dye composition, and |
| 1–25% by weight | of poly-N-vinylformamide and/or of a polymer obtained by polymerization of a mixture of one or more ethylenically unsaturated monomers and >50% by weight of N-vinylformamide based on total monomers, | based on the total weight of the aqueous liquid formulation.

10 Claims, No Drawings

LIQUID FORMULATIONS OF DIRECT DYES

The present invention relates to aqueous liquid formulations comprising

| | |
|---|---|
| 5–25% by weight | of a dye composition comprising |
| 20–100% by weight | of Direct Yellow 11 or of a dye obtainable by reduction or thermal treatment of Direct Yellow 11 |
| 0–30% by weight | of a blue direct dye, |
| 0–30% by weight | of a red direct dye, and |
| 0–60% by weight | of a brown direct dye all based on the dye composition, and |
| 1–25% by weight | of poly-N-vinylformamide and/or of a polymer obtained by polymerization of a mixture of one or more ethylenically unsaturated monomers and >50% by weight of N-vinylformamide based on total monomers, | based on the total weight of the aqueous liquid formulation, and also their use for dyeing cellulose material especially paper.

The manufacture of packaging material requires brown dyes having a light brown hue which only varies within narrow limits. The brown dye can be a synthesized mixture of dyes, as in the case of Basic Brown 1, or a blended mixture of a yellow dye, a blue dye and if appropriate a red dye. Blended dye mixtures have the great advantage that it is easier to shade the hue. It is more difficult, however, to obtain storage-stable liquid formulations of these blended dye mixtures.

Poor stability of a liquid-formulation in storage results from the often limited solubility of dyes in water, since limited solubility in water is usually in turn associated with a desired high affinity for fiber. While this has no repercussion on the dye concentration in the papermaking machine because the concentration is low, it can have immense consequences for the commercially ever more popular liquid formulations. The poor storage stability of the liquid formulation often gives rise to problems when the drums have to be stored for a prolonged period. During this period, both low and high temperatures can lead to precipitates which can be critical for metering pumps but can also lead to specks or nonuniform colorations on paper. Storage stability is even more problematical in the case of a blended dye mixture, since in this case more than one dye has to be kept in solution at one and the same time.

Dye formulation solubility is generally improved by addition of solubility improvers which often also serve as a counter-ion to the dye acids. Known solubility improvers come from a wide range of chemical classes such as alcohols, mono-, oligo- or polyalkylene glycols, lactams, amines and amides.

EP-A-1 258 562 describes brown mixtures blended with Direct Yellow 11 and also with Direct Orange 15, but they do not comprise any solubility-improving additives whatsoever.

Prior European application 3 029 578 teaches storage-stable liquid formulations of reddened Direct Yellow 11 through addition of a mixture of urea and ethanolamine.

Low molecular weight polyvinylformamide and also its hydrolysis product, polyvinylamine, are fixing agents in papermaking. The cationic charge on polyvinylamine brings about a bond between anionic dyes and the weakly anionically charged fibers of paper and thus fixes the dyes added to the aqueous paper stock in the course of the dyeing operation on the paper fiber. EP-A-663 031 teaches the addition of polyvinylformamide of varying degrees of hydrolysis as a fixing agent for pulp dyeing during the papermaking operation.

JP 01 024 873 describes recording fluids comprising poly-N-vinyl formamide. These recording fluids, however, comprise no dye composition with Direct Yellow 11.

It would be desirable, then, to be able to offer ready-blended brown mixtures to paper manufacturers specific to their respective raw pulps for the manufacture of packaging material. This would be beneficial to each paper manufacturer because they would no longer have to self-mix and would only have to store one brown dye mixture in future. So the storage stability of brown aqueous liquid formulations is the central concern of the present invention. Since the brown liquid formulation is produced from a yellow/orange liquid formulation, which is shaded with red and blue, the yellow/orange liquid formulation must likewise have a high stability in storage. In addition, the assistants added to the yellow/orange liquid formulation must also have a stabilizing effect in the brown liquid formulation, since it would be impracticable to remove them again.

The present invention thus has for its object a liquid formulation which possesses improved stability in storage both at low and at high temperatures not only for the yellow/orange dye but also for the brown composition of dyes.

We have found that this object is achieved by the above-mentioned liquid formulations.

According to the present invention, the aqueous liquid formulation comprises poly-N-vinylformamide and/or a polymer obtained by polymerization of a mixture of one or more ethylenically unsaturated monomers and >50% by weight of N-vinylformamide based on the total monomers.

Poly-N-vinylformamide is a polymer having an average molecular weight in the range of $\leq 340\,000$. The average molecular weight was determined by static scattering of light. Preference is given to a poly-N-vinylformamide whose average molecular weight is in the range of 300–100 000 especially from 300 to 10 000. Poly-N-vinylformamide is common knowledge. It is obtained by polymerization of vinylformamide. Its preparation is described for example in DE-A-312 84 78.

N-Vinylformamide is polymerized by known processes using free-radical polymerization initiators, such as peroxides, hydroperoxides, redox catalysts or azo compounds that disintegrate to form free radicals. The polymerization is carried out in a solvent or diluent medium in a temperature range from 30 to 140° C. The molecular weight of the polymers obtained differs as a function of the polymerization conditions and can be characterized using Fikentscher's K values. The K value can vary in a wide range between 10 and 200. Polymers having a high K value, for example above 80, are preferably prepared by polymerizing N-vinylformamide in water. Polymers having a lower K value, for example below 80, are obtained on polymerizing in the presence of known polymerization regulators or in a solvent which regulates the polymerization, examples being alcohols, such as methanol, ethanol, n-propanol and isopropanol, and also acetone and methyl ethyl ketone. Examples of other polymerization regulators are hydroxylammonium salts, chlorinated hydrocarbons and thio compounds, such as dodecyl mercaptan. Polymers of a lower K value are obtainable for example by using polymerization initiators which are soluble therein and based on azo compounds. 2,2'-Azobis(isobutyronitrile) is an example of an azo compound particularly useful for polymerization in isopropanol. High molecular weight polymers of N-vinylformamide are prepared using water-soluble azo compounds, examples being 2,2'-azobis(2-amidino-propane) hydrochloride and 4,4'-azobis(4'-cyanopentanoic acid), the reaction being carried out in aqueous solution. The polymerization can be carried out in the manner of a water-in-oil emulsion polymerization as well as a solution polymerization in water, a water-soluble solvent, mixtures of water and a water-soluble solvent. Similarly, inverse suspension polymerization is possible to prepare finely divided polymers. The pH of the polymerization reaction, if carried out in an aqueous medium, is in the range from 4 to 9. The solution polymerization predominantly produces polymer solutions whose solids content is in the range from 5 to 50% by weight.

It is in the nature of the polymer's preparation and also in the nature of an aqueous liquid formulation that hydrolysis of amide to amine groups is not completely avoidable. Polyvinylformamide herein accordingly refers to a polymer comprising up to 20 mol % of hydrolyzed groups. The degree of hydrolysis is simple to determine by polyelectrolyte titration. The degree of hydrolysis is preferably ≦15 mol %, especially ≦10 mol % and most preferably ≦5 mol %.

Useful ethylenically unsaturated comonomers include for example vinyl formate, vinyl acetate, vinyl propionate, acrylonitrile, N-vinylcaprolactam, N-vinylurea, N-vinylpyrrolidone, $C_1$- to $C_6$-alkyl vinyl ether, N-vinylacetamide, methyl acrylate and methyl methacrylate.

Preference is given to aqueous liquid formulations comprising 5–25% by weight of the dye composition and 1–25% by weight and especially 1–15% by weight of poly-N-vinylformamide based on the total weight of the liquid formulation.

The weight % ages reported for dyes are each based on the dye reckoned in the form of its free acid. The dyes are present in the liquid formulation in the form of their salts.

The dyes obtained by reaction of Direct Yellow 11 preferably have alkali metal ions such as sodium, potassium and especially lithium ions as counter-ions.

Direct Yellow 11 and Direct Orange 15 are stilbene dyes. Direct Yellow 11 is obtained as a product of the self-condensation of 5-nitro-o-toluenesulfonic acid in an aqueous alkaline medium. Its reaction with reducing agents such as glucose or sodium sulfide leads to Direct Orange 15 (C.I. 40002 or 40003). These dyes are mixtures of dyes of uncertain constitution. Direct Orange 15 is a mixture whose CIELAB hue angle on bleached cellulose varies in the range from 45 to <55 in the color space. Reducing Direct Yellow 11 substoichiometrically with regard to the nitrotoluenesulfonic acid gives dye mixtures having a yellowish orange hue. This bathochromic shift in the hue is also referred to as the "reddening" of Direct Yellow 11. Such reddening can also be achieved through thermal treatment of Direct Yellow 11 at a pH in the range of 12–13.

Preference is given to yellowish orange dyes (hereinafter also referred to as partially reddened dyes) which are obtainable by reduction or thermal treatment of Direct Yellow 11 and whose hue angle on bleached cellulose is in the range from 55 to 75 and especially in the range from 55 to 65 in the color space.

Blue direct dyes are direct-dyeing dyes with an absorption maximum in the wavelength range from 560 to 650 nm. Red direct dyes are direct-dyeing dyes having an absorption maximum in the wavelength range from 490 to 540.

Preference is given to blue direct dyes such as Direct Violet 9 (C.I. 27855), Direct Violet 35, Direct Violet 51 (C.I. 27905), Direct Blue 86 (C.I. 74180), Direct Blue 199 (C.I. 74190), Direct Blue 218 (C.I. 24401), Direct Blue 267, Direct Blue 273, Direct Blue 279, Direct Blue 281, Direct Blue 71, 273 as copper complex, and 290. Particular preference is given to Direct Blue 15, 279, 281, 290 and the dyes of the formulae I, II and III.

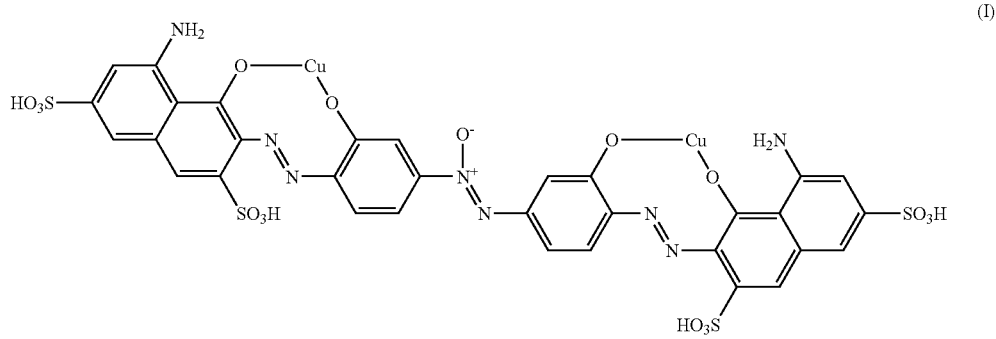

(I)

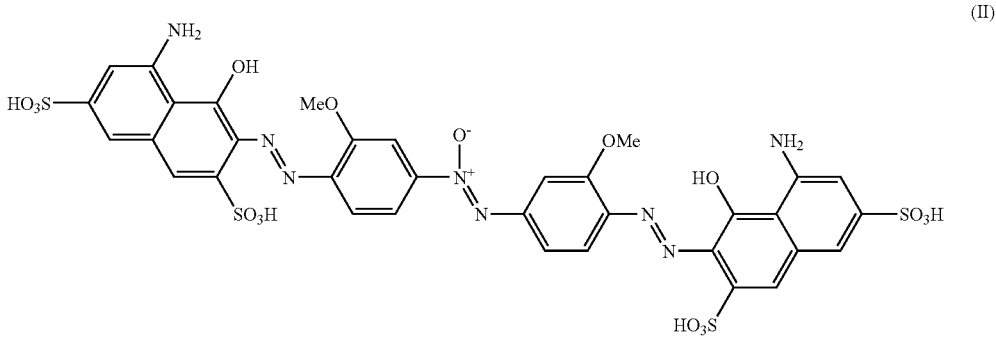

(II)

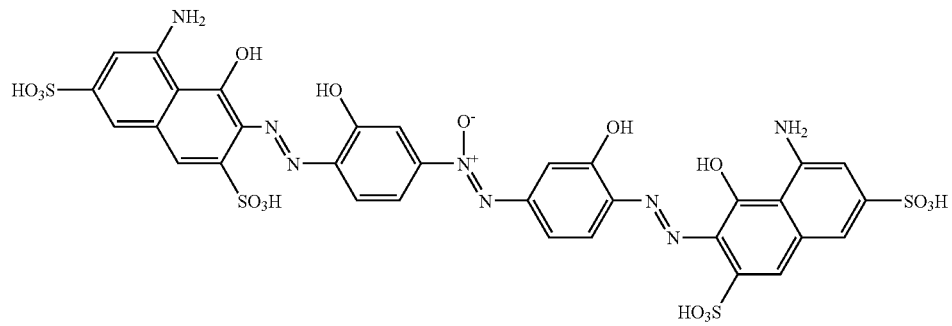

Preference is likewise given to red direct dyes such as Direct Red 80, Direct Red 81 (C.I. 28160), Direct Red 239, Direct Red 252–255 and Direct Red 262.

It is further possible to use a brown direct dye, preferably Direct Brown 44, for shading. In this case, in general, no red dye is used.

Depending on the desired brown hue, it is possible to additionally shade with an orange dye. Examples of orange dyes are Direct Orange 15, Direct Orange 34 (C.I. 40215) and Direct Orange 102 (C.I. 29156). However, this will generally not be done, since partially reddened dyes and if appropriate the red or the brown direct dye make it possible to achieve all hues.

Preference is given to aqueous liquid formulations whose dye composition comprises

| | |
|---|---|
| 40–95% by weight | of a dye obtainable by reduction or thermal treatment of Direct Yellow 11, preferably partially reddened Direct Yellow 11, |
| 3–25% by weight | of a blue direct dye, |
| 0–25% by weight | of a red direct dye, and |
| 0–40% by weight | of a brown direct dye, preferably Direct Brown 44. |

Particular preference is given to aqueous liquid formulations whose dye composition comprises

| | |
|---|---|
| 70–92% by weight | of a dye obtainable by reduction or thermal treatment of Direct Yellow 11, preferably partially reddened Direct Yellow 11 |
| 5–15% by weight | of a dye selected from Direct Blue 15, 273, 279, 280, 290 and the dyes of the formula I, II and III, |
| 3–15% by weight | of a dye selected from Direct Red 81, 239, 254 and |
| 0–30% by weight | of Direct Brown 44. |

Preference is further given to aqueous liquid formulations whose dye composition comprises

| | |
|---|---|
| 40–80% by weight | of a dye obtainable by reduction or thermal treatment of Direct Yellow 11, preferably partially reddened Direct Yellow 11, |
| 5–25% by weight | of a dye selected from Direct Blue 15, 273, 279, 281, 290 and the dyes of the formula I, II and III, |
| 15–35% by weight | of a brown direct dye, preferably Direct Brown 44. |

Likewise of advantage are liquid formulations whose dye composition comprises

| | |
|---|---|
| 25–45% by weight | of Direct Yellow 11 |
| 5–20% by weight | of a dye selected from Direct Blue 15, 273, 279, 281, 290 and the dyes of the formula I, II and III |
| 40–60% by weight | of a brown direct dye preferably Direct Brown 44. |

Also of advantage are liquid formulations whose dye composition comprises

| | |
|---|---|
| 50–90% by weight | of Direct Yellow 11 |
| 5–25% by weight | of a dye selected from Direct Red 81, 239, 254 and |
| 5–25% by weight | of a dye selected from Direct Blue 15, 273, 279, 281, 290 and the dyes of the formula I, II and III. |

A reddening of Direct Yellow 11 is obtained for example by reacting it with formaldehyde or by basic condensation of 5-nitrotoluenesulfonic acid in the presence of formaldehyde. Reddening is further achieved by adding glucose or sodium sulfide. Further reddening reactions are to be found in the Colour Index and its literature references to the dyes C.I. 40001, 40002, 40003.

Preference is given to dyes which are obtained by reaction of Direct Yellow 11 with an organic reducing agent. Examples of organic reducing agents are hydroxy aldehydes such as pentoses, hexoses and heptoses, preferably glucose.

The preferred partially reddened dyes are obtainable by substoichiometric reduction based on nitrotoluenesulfonic acid.

Particularly preferred partially reddened dyes are obtained by reaction of Direct Yellow 11 with 0.05 to 0.3 mol and preferably 0.1 to 0.25 mol of hydroxy aldehyde, especially glucose, per mole of nitrotoluenesulfonic acid used. When the desired hue is attained, the reddening reaction may be stopped by neutralizing and cooling.

The synthesis of Direct Yellow 11 is common knowledge. Direct Yellow 11 is obtained by heating an alkaline aqueous solution of nitrotoluenesulfonic acid. The reaction of nitrotoluenesulfonic acid with an alkali metal hydroxide such as sodium hydroxide or preferably lithium hydroxide first produces the salt of nitrotoluenesulfonic acid, and it condenses on heating to 40–80° C. in the basic medium to form the azostilbene dye.

Prior to the condensation reaction, the mixture is preferably admixed with a water-soluble alkanolamine, in an amount of 0.1 to 0.5 mol of alkanolamine per mole of nitrotoluenesulfonic acid. Alkanolamines are for example ethanolamine, isopropanolamine or preferably diethanolamine. It is believed that such an addition has a solubilizing effect on reaction intermediates.

After condensation and cooling, the alkaline mixture is substantially neutralized, for example with acetic acid. Neutralizing as used herein refers to a pH in the range from 7 to 9.

In a preferred version, the fully or partially reddened dye is prepared using a Direct Yellow 11 which is obtainable by reacting 1 mol of nitrotoluenesulfonic acid with 1.4 to 1.8 mol of lithium hydroxide, addition of 0.1 to 0.5 mol of alkanolamine, heating the reaction mixture to 40–80° C. and neutralizing.

In a particularly preferred version, the synthesis of Direct Yellow 11 and the reddening step are carried out without intervening isolation of Direct Yellow 11. The partially reddened dye is then obtainable directly by reaction of 1 mol of nitrotoluenesulfonic acid with 1.4 to 1.8 mol of lithium hydroxide, addition of 0.1 to 0.5 mol of alkanolamine, heating the reaction mixture to 40–80° C., reacting with 0.05 to 0.3 mol of glucose based on one mole of nitrotoluenesulfonic acid used and neutralization.

Particular preference is given to a procedure where the temperature is raised continuously, in a linear or nonlinear manner, or periodically during coupling and reduction. The temperature difference between the start of the coupling reaction and the end of the reduction reaction may be up to 40 K. Generally, this difference is in the range from 15 to 25 K.

Preference is given to aqueous liquid formulations comprising polyvinylformamide combined with urea. Preference is given to aqueous liquid formulations comprising 5–25% by weight of dye composition, 1–25% preferably 1–15% by weight of poly-N-vinylformamide and 1–30% by weight of urea, based on the total weight of the aqueous liquid formulation, the total amount of poly-N-vinylformamide and urea not exceeding 40% by weight.

Mixtures are preferred in which the sum total of the two components is 10–25% by weight. Consequently, for a low polyvinylformamide content in the range of 1–5% by weight, high urea contents in the range of >9–24% by weight are preferred. When only 1–9% by weight of urea is added, the preferred fraction of polyvinylformamide is >5–16% by weight.

Preference is given to aqueous liquid formulations comprising 10–25% by weight of dye composition, 1–15% by weight of poly-N-vinylformamide and 1–30% by weight of urea. Particular preference is given to aqueous liquid formulations comprising 15–20% by weight of dye composition specifically the preferred dye compositions, 1–10% by weight of poly-N-vinylformamide and 1–20% by weight of urea.

Preferred liquid formulations further comprise diethanolamine due to synthesis. Preference is therefore given to liquid formulations comprising 5–25% by weight of dye composition, 1–15% by weight and preferably 1–10% by weight of poly-N-vinyl-formamide, 0.5–5% by weight and preferably 1.5–3% by weight of an alkanolamine and 1–30% by weight and preferably 1–25% by weight of urea.

The dyes may be used as a moist presscake or else in dried form. In this case, a solution is prepared by admixing the poly-N-vinylformamide and the urea. The reaction mixture is preferably used directly for the reddening reaction of Direct Yellow 11 without additional isolating steps. Preferably, urea is added first to the resulting reaction mixture from the reddening reaction of Direct Yellow 11. Then the poly-N-vinylformamide is added with or without the other dyes.

Further additives in the liquid formulation can be in principle $C_1$–$C_4$-alkanols, for example methanol, ethanol, propanol, isopropanol, butanol, isobutanol, sec-butanol or tert-butanol, carboxamides, such as N,N-dimethylformamide or N,N-dimethylacetamide, ketones or keto alcohols, such as acetone, methyl ethyl ketone or 2-methyl-2-hydroxypentan-4-one, mono-, oligo- or polyalkylene glycols or thioglycols which have $C_2$–$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol, other polyols, such as glycerol or hexane-1,2,6-triol, $C_1$–$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyidiglycol) or triethylene glycol monomethyl ether or triethylene glycol monoethyl ether, $C_1$–$C_4$-alkyl esters of polyhydric alcohols, γ-butyrolactone or dimethyl sulfoxide. Suitable solubilizing additives are further lactams, such as ε-caprolactam, pyrrolidin-2-one or N-methylpyrrolidin-2-one, cyclic ureas, such as 1,3-dimethylimidazolidin-2-one or 1,3-dimethylhexahydropyrimid-2-one, and also polyacrylic acids, polyacrylic acid derivatives, polyvinyl acetates, polyvinyl alcohols, polyvinylpyrrolidones, polysiloxanes or copolymers of the respective monomers. It is further possible to use oligomers of ethylene oxide or propylene oxide or derivatives of these oligomers.

These additives can be added to the liquid formulation, but do not provide any significant effect. Their fraction would therefore in general not exceed 10% by weight, based on the total weight of the liquid formulation, and is frequently not more than 5% by weight. In a preferred embodiment, the liquid formulations of the present invention comprise no such additives (i.e. <1% by weight). In another preferred embodiment, liquid formulations comprising Direct Brown 44 further comprise up to 5% by weight of polyethylene glycol additive.

The solutions obtained have excellent stability in storage. They provide good paper coloration especially in the pulp.

The examples which follow illustrate the invention.

a) Preparation of Reddened Direct Yellow 11

To 1.54 l of water were added 1.10 kg of p-nitrotoluenesulfonic acid (83% pure by weight, 4.21 mol). A total of 300 g of solid lithium hydroxide (56% pure by weight, 7 mol) were added a little at a time. Then 110 g of diethanolamine were added and the mixture was stirred at 55° C. for 15 h. One liter of water was added. The mixture was stirred for 10 min, 125 g of glucose monohydrate were added and the temperature was raised to 65° C. for 2 h. Then a pH of 9.0 was set with 50 g of glacial acetic acid. The product was obtained as brownish red gellike substance. It was obtained in an amount of 4.19 kg and had a dye content of 26.2%.

b) Preparation of Direct Yellow 11

To 1.54 l of water were added 1.10 kg of p-nitrotoluenesulfonic acid (83% pure by weight, 4.21 mol). A total of 270 g of solid lithium hydroxide (56% pure by weight, 7 mol) were added a little at a time. Then 83 g of diethanolamine were added and the mixture was stirred at 55° C. for 15 h. 1.7 liters of water were added. The temperature was raised to 65° C. for 2 h. Then a pH of 9.0 was set with 70 g of glacial acetic acid. The product was obtained as brownish red gellike substance. It was obtained in an amount of 4.75 kg and had a dye content of 25.0%.

c) Test for Stability in Storage

Sealed samples were stored concurrently at 4° C. and 50° C. for 8 weeks and subsequently visually assessed according to the following key: 1=sample runoff clear, no residues; 1–2=sample runoff clear, very little residue visible; 2=sample runoff not clear, marked sediment or wall coating; 2–3=distinct sediment, pronounced wall coating; 3=substantial sediment, considerable wall coating or sample becomes solid or gellike.

d) Production of Liquid Formulation

EXAMPLE 1

25.7 g of the reddened Direct Yellow 11 obtained according to a), 4.8 g of poly-N-vinyl-formamide having an average molecular weight of 1500, 1.0 g of Direct Red 81 in the form of a concentrated aqueous solution of the triethanolammonium salt, 1.0 g of Direct Blue 281 in the form of a concentrated aqueous solution of the mixed sodium/lithium salt and also 17.9 g of water were added together and intensively stirred for 10 min. The sample was then filled into a 50 ml screw top glass and stored like that at the appropriate temperature for 8 weeks. This sample was given a rating of 1–2 after 8 weeks at 4° C. and 1–2 after 8 weeks at 50° C.

Liquid formulations were produced similarly to Example 1 using the compositions reported in Table 1. Table 2 gives the chosen dye compositions. The yellow dye used in Examples 1–9 and Comparative Examples V1 and V2 was the reddened Direct Yellow 11 (dye content 26.2% by weight) prepared according to a) and in Examples 10, 11 and V3 the nonreddened Direct Yellow 11 prepared according to b) (dye content 25.0%).

TABLE 1

| Ex. | Urea [g] | Urea [%] | Polyvinyl-formamide* [g] | Polyvinyl-formamide* [%] | H$_2$O [g] | Dye composition [g] | Dye composition [%] | Stability after 8 weeks 4° C. | Stability after 8 weeks 50° C. |
|---|---|---|---|---|---|---|---|---|---|
| 1 | 0.0 | 0 | 4.8 | 8 | 17.9 | 8.8 | 14 | 1–2 | 1–2 |
| 2 | 0.0 | 0 | 4.6 | 5 | 17.0 | 18.3 | 18 | 1–2 | 1–2 |
| 3 | 0.0 | 0 | 25.0 | 10 | 92.5 | 34.7 | 14 | 1 | 1–2 |
| 4 | 4.6 | 5 | 4.6 | 5 | 12.4 | 18.3 | 18 | 1–2 | 1–2 |
| 5 | 25.0 | 10 | 25.0 | 10 | 67.5 | 34.7 | 14 | 1–2 | 1–2 |
| 6 | 4.2 | 14 | 0.2 | 1 | 5.9 | 4.9 | 16 | 1 | 1–2 |
| 7 | 4.2 | 14 | 0.4 | 1 | 5.7 | 4.9 | 16 | 1–2 | 1 |
| 8 | 9.2 | 9 | 0.9 | 1 | 11.5 | 18.3 | 18 | 1–2 | 1–2 |
| 9 | 50.0 | 20 | 5.0 | 2 | 62.5 | 34.7 | 14 | 1 | 1–2 |
| 10 | 9.2 | 9 | 0.9 | 1 | 11.0 | 18.1 | 18 | 1 (6W) | 2 (6W) |
| 11 | 9.2 | 9 | 0.5 | 1 | 11.5 | 18.1 | 18 | 1–2 (6W) | 1–2 (6W) |
| V1 | 21.2 | 21 | 0.0 | 0 | 15.0 | 16.7 | 17 | 1–2# | 2# |
| V2 | 22.5 | 22 | 0.0 | 0 | 15.8 | 16.2 | 16 | 1–2 | 2–3 |
| V3 | 11.2 | 11 | 0.0 | 0 | 7.8 | 18.6 | 19 | 3 (4W) | 3 (4W) |

Coating
*Polyvinylformamide used had an average molecular weight of 1500.

TABLE 2

| Ex. | Yellow dye [g]$^{1)}$ | Yellow dye [g]$^{2)}$ | Yellow dye [%]* | Red/brown dye** type | Red/brown dye** [g] | Red/brown dye** [%]* | Blue dye*** type | Blue dye*** [g] | Blue dye*** [%]* | Total dyes [g] |
|---|---|---|---|---|---|---|---|---|---|---|
| 1 | 25.7 | 6.7 | 77 | D.R. 81 | 1.0 | 12 | D.B. 281 | 1.0 | 12 | 8.8 |
| 2 | 24.3 | 6.4 | 35 | D.Bn. 44 | 9.2 | 50 | D.B. 279 | 2.8 | 15 | 18.3 |
| 3 | 132.5 | 34.7 | 100 | — | 0.0 | 0 | — | 0.0 | 0 | 34.7 |
| 4 | 24.3 | 6.4 | 35 | D.Bn. 44 | 9.2 | 50 | D.B. 279 | 2.8 | 15 | 18.3 |
| 5 | 132.5 | 34.7 | 100 | — | 0.0 | 0 | — | 0.0 | 0 | 34.7 |
| 6 | 10.7 | 2.8 | 57 | DBn. 44 | 1.3 | 27 | D.B. 279 | 0.8 | 15 | 4.9 |
| 7 | 10.7 | 2.8 | 57 | D.Bn. 44 | 1.3 | 27 | D.B. 279 | 0.8 | 15 | 4.9 |
| 8 | 24.3 | 6.4 | 35 | D.Bn. 44 | 9.2 | 50 | D.B. 279 | 2.8 | 15 | 18.3 |
| 9 | 132.5 | 34.7 | 100 | — | 0.0 | 0 | — | 0.0 | 0 | 34.7 |
| 10 | 24.7 | 6.2 | 34 | D.Bn. 44 | 9.2 | 51 | D.B. 279 | 2.8 | 15 | 18.4 |
| 11 | 24.7 | 6.2 | 34 | D.Bn. 44 | 9.2 | 51 | D.B. 279 | 2.8 | 15 | 18.4 |
| V1 | 51.2 | 13.4 | 80 | D.R. 239 | 0.8 | 5 | D.B. 279 | 2.4 | 14 | 16.7 |
| V2 | 54.1 | 14.2 | 88 | D.R. 81 | 0.2 | 1 | D.B. 279 | 1.8 | 11 | 16.2 |
| V3 | 26.8 | 6.7 | 36 | D.Bn. 44 | 9.2 | 49 | D.B. 279 | 2.8 | 15 | 19.0 |

$^{1)}$Dye weight of product of yellow synthesis a) or b)
$^{2)}$Converted to dye fraction in grams
*Converted to dye fraction in percent
**The amount of dye acid is reported. D.R. 239 is added as a concentrated aqueous solution of the mixed sodium/ethanolammonium salt, D.R. 81 as a concentrated aqueous solution of the triethanolammonium salt, D.Bn. 44 as a concentrated aqueous solution of the mixed sodium/ammonium salt
***The amount of dye acid is reported. D.B. 279 is added as a concentrated aqueous solution of the triethanolammonium salt, D.B 281 as a concentrated aqueous solution of the mixed sodium/lithium salt.

What is claimed is:

1. A ready-blended aqueous liquid formulation for use in the dyeing of paper fiber comprising
   5–25% by weight of a dye composition comprising
      20–100% by weight of Direct Yellow 11 or of a dye obtainable by reduction or thermal treatment of Direct Yellow 11
      0–30% by weight of a blue direct dye,
      0–30% by weight of a red direct dye, and
      0–60% by weight of a brown direct dye all based on the dye composition, and
   1–25% by weight of poly-N-vinylformamide and/or of a polymer obtained by polymerization of a mixture of one or more ethylenically unsaturated monomers and >50% by weight of N-vinylformamide based on total monomers, based on the total weight of the aqueous liquid formulation.

2. The aqueous liquid formulation according to claim 1 that comprises
   5–25% by weight of the dye composition and
   1–25% by weight of poly-N-vinylformamide
   based on the total weight of the aqueous liquid formulation.

3. The aqueous liquid formulation according to claim 1 whose dye composition comprises
   40–95% by weight of a dye obtainable by reduction or thermal treatment of Direct Yellow 11,
   3–25% by weight of a blue direct dye,
   0–25% by weight of a red direct dye, and
   0–40% by weight of a brown direct dye.

4. The aqueous liquid formulation according to claim 1 whose dye composition comprises
   25–45% by weight of Direct Yellow 11
   5–20% by weight of a dye selected from Direct Blue 15, 273, 279, 281, 290 and the dyes of the formula I, II and III
   40–60% by weight of a brown direct dye
   wherein the dyes of the formulae I, II and III are as follows:

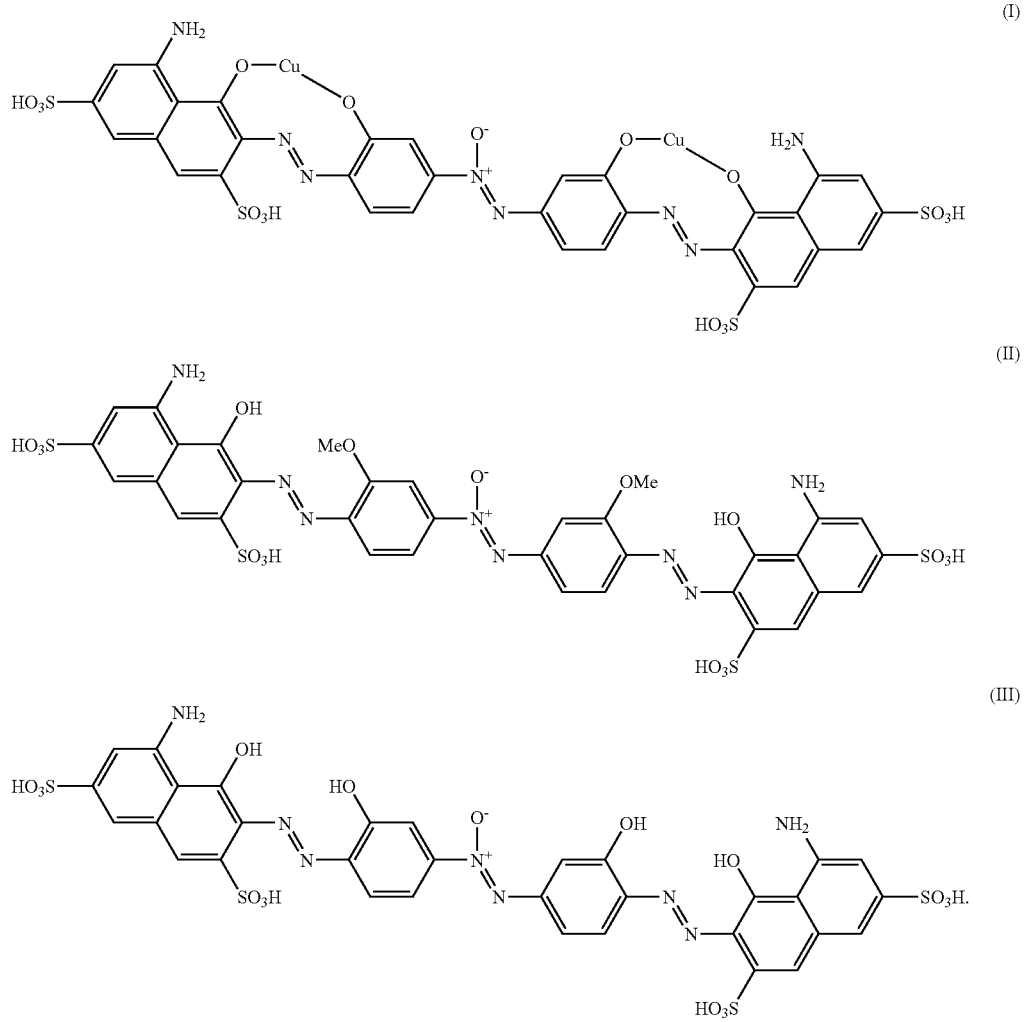

5. The aqueous liquid formulation according to claim 1 whose dye composition comprises
   50–90% by weight of Direct Yellow 11
   5–25% by weight of a dye selected from Direct Red 81, 239, 254 and
   5–25% by weight of a dye selected from Direct Blue 15, 273, 279, 281, 290 and the dyes of the formula I, II and III
   wherein the dyes of the formulae I, II and III are as follows:

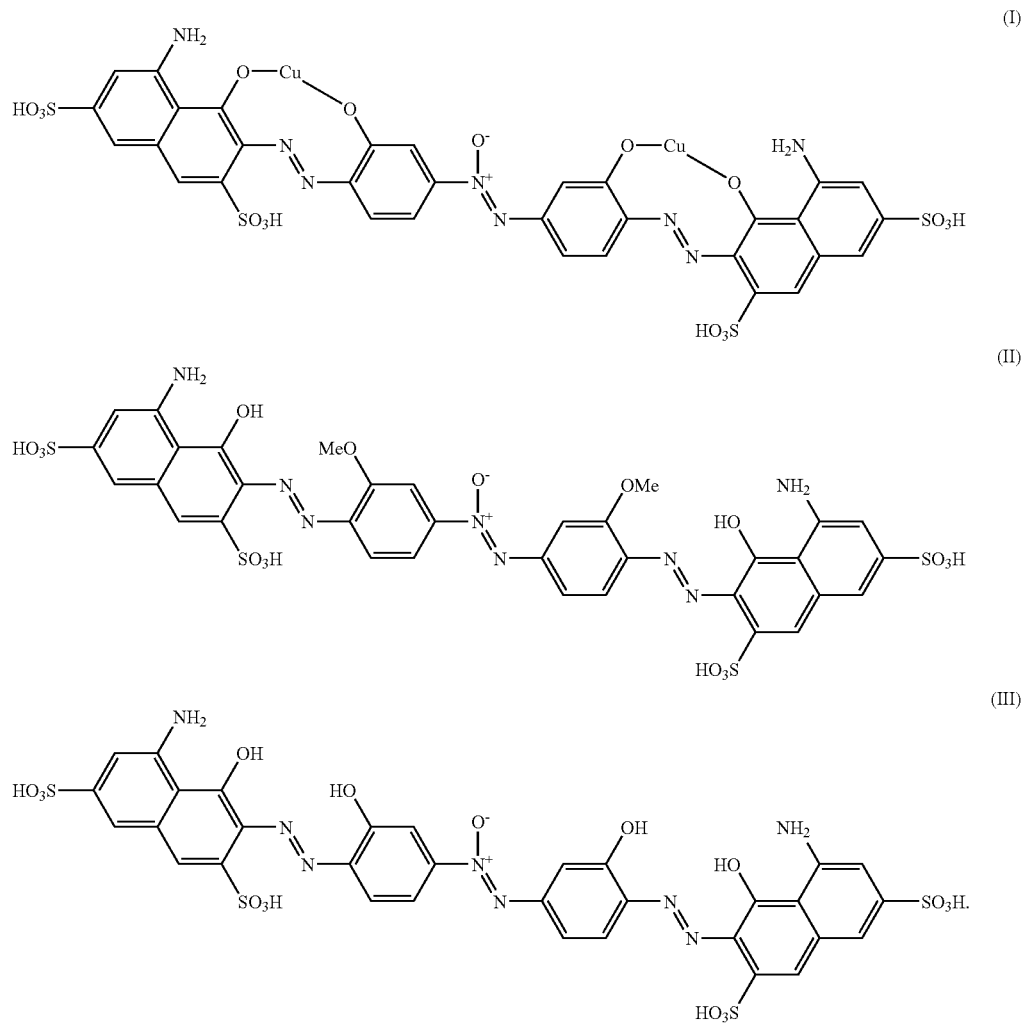

6. The aqueous liquid formulation according to claim 1 whose dye composition comprises a dye obtainable by reaction of Direct Yellow 11 with an organic reducing agent.

7. The aqueous liquid formulation according to claim 1 that comprises
  5–25% by weight of the dye composition
  1–25% by weight of poly-N-vinylformamide, and further comprises
  1–30% by weight of urea
  based on the total weight of the aqueous liquid formulation, the total amount of poly-N-vinylformamide and urea not exceeding 40% by weight.

8. The aqueous liquid formulation according to claim 1 that comprises
  5–25% by weight of the dye composition
  1–10% by weight of poly-N-vinylformamide; and further comprises
  0.5–5% by weight of alkanolamine and
  1–25% by weight of urea.

9. A method of dyeing cellulose material comprising contacting the aqueous liquid formulation according to claim 1 with cellulose material.

10. The aqueous liquid formulation of claim 3, wherein said brown direct dye is Direct Brown 44.

* * * * *